J. L. TOMER.
WAGON BRAKE.
APPLICATION FILED FEB. 2, 1910.
977,346.
Patented Nov. 29, 1910.
2 SHEETS—SHEET 1.
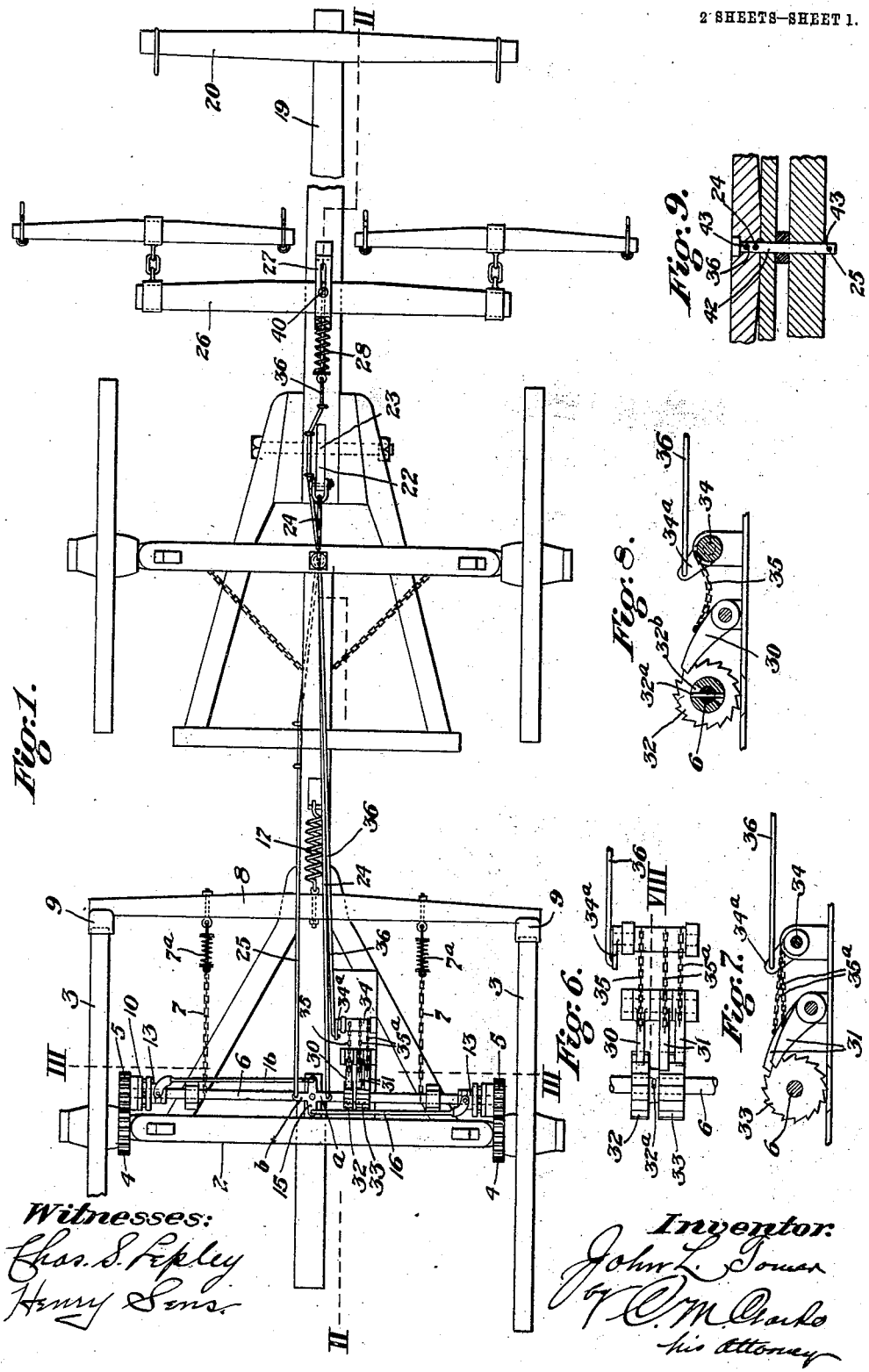

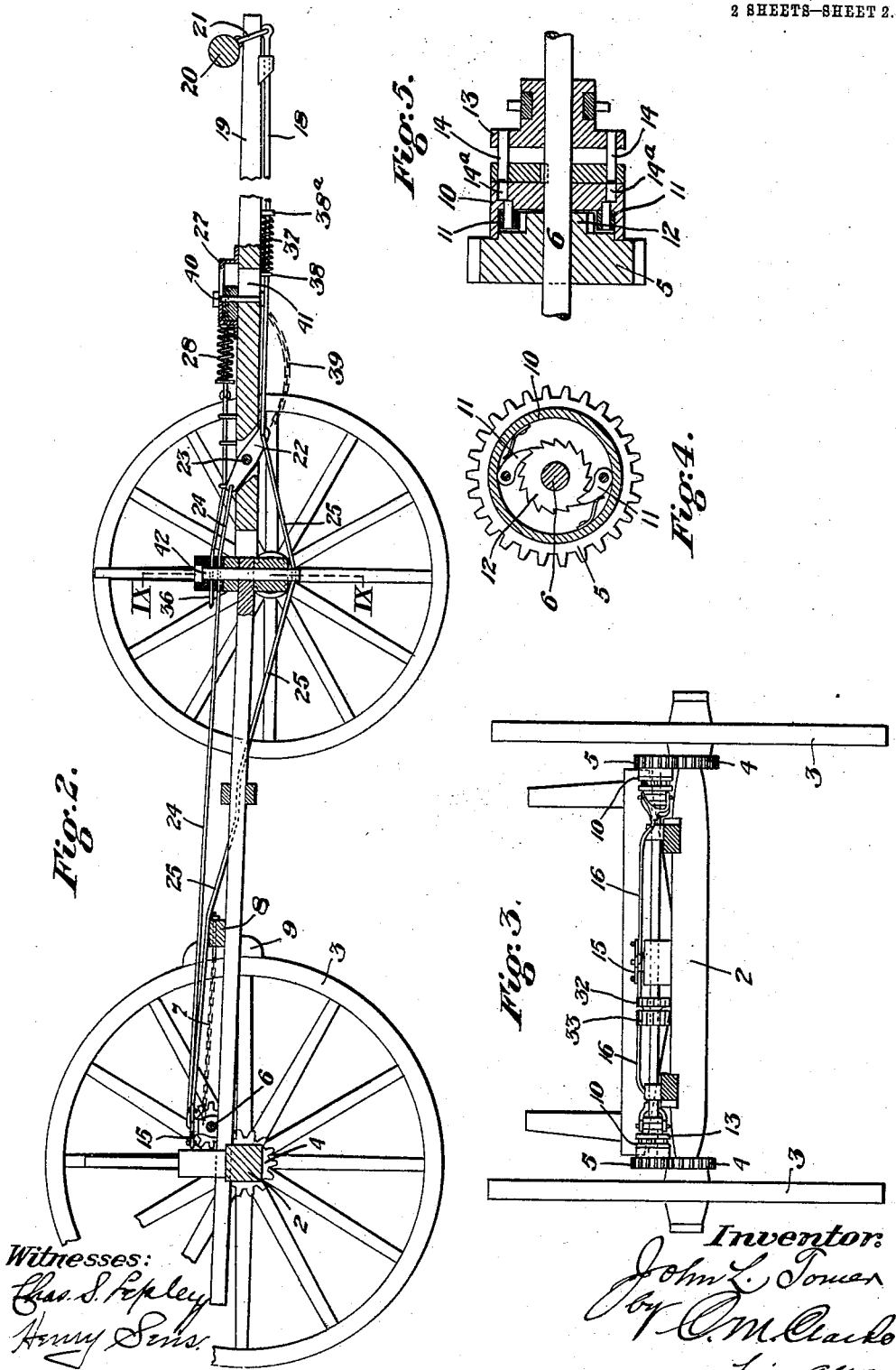

UNITED STATES PATENT OFFICE.

JOHN L. TOMER, OF EXPORT, PENNSYLVANIA.

WAGON-BRAKE.

977,346.  Specification of Letters Patent.  Patented Nov. 29, 1910.

Application filed February 2, 1910. Serial No. 541,488.

*To all whom it may concern:*

Be it known that I, JOHN L. TOMER, a citizen of the United States, residing at Export, in the county of Westmoreland and State of Pennsylvania, have invented certain new and useful Improvements in Wagon-Brakes, of which the following is a specification, reference being had therein to the accompanying drawing.

My invention consists of an improvement in wagon brakes and is designed to provide means for automatically applying and releasing the brakes in conformity with changes in grades and the accompanying action of the team. The mechanism by which these results are accomplished consists of gearing and clutch mechanism rendered operative by a push rod actuated by a neck yoke at the front end of the wagon tongue operating through lever mechanism to thrust the clutch mechanism into gear, a winding shaft geared with the clutched gear and chains adapted to wind thereon and to draw the brake beam and shoes against the wheels, ratchet mechanism for locking and unlocking the winding shaft and means connected with it and with the double tree of the draft gearing, and other features of construction and detail as shall be more fully hereinafter set forth.

Referring to the drawings: Figure 1 is a plan view of the apparatus as applied to a wagon. Fig. 2 is a longitudinal sectional view on the line II. II. of Fig. 1. Fig. 3 is a transverse view on the line III. III. of Fig. 1. Figs. 4 and 5 are enlarged sectional detail views of the clutch mechanism and gearing. Figs. 6 and 7 are similar views in elevation and plan of the ratchet lock and release mechanism. Fig. 8 is a sectional view on the line VIII. of Fig. 6. Fig. 9 is a sectional view on the line IX. IX. of Fig. 2.

2 represents the rear axle of a wagon having the usual wheels 3, 3, and at one or both ends, conveniently secured to the hubs, are the pinion wheels 4, 4, gearing into the normally loose gears 5, 5, mounted freely on the ends of chain shaft 6. Said shaft is mounted in suitable bearings transversely of the frame of the wagon and is provided with winding chains 7, preferably having cushioning springs $7^a$, engaging brake beam 8 and adapted to draw the brake shoes 9 thereof against the wheels.

10 is a wheel loosely mounted on shaft 6 having pawls 11 which engage the teeth of ratchet wheel 12 of gear 5 when said gear is actuated by pinion 4 in forward travel of the vehicle, but which operate freely in backing, actuating the ratchet wheel 12 freely under the pawls without result as to movement of wheel 10.

13 is a clutch having pins or teeth 14 adapted to engage corresponding sockets or teeth $14^a$ of wheel 10 when thrust toward it, said clutch being splined or keyed on shaft 6 as shown.

15 is a lever, the arms of which are connected by rods 16 with clutches 13, so that as the lever is operated in one direction it will throw in the clutch to wind shaft 6 and apply the brakes, and in the other direction it will release the clutch and brakes, a spring 17 being connected to the brake beam for throwing the brake beam back.

18 is a stiff push rod mounted along underneath the tongue 19 in suitable sliding bearings connected at the front with the neck yoke 20 by a ring 21 and at the rear to the end of a lever 22 pivoted at 23 in the framework. Its upper end is connected by wire or chain 24 with one arm $a$ of lever 15, while the lower end of lever 22 is also connected by a wire or chain 25 with another arm $b$ of the same lever, as shown. When backward movement is imparted to the rod 18 by the neck yoke 20, as in descending a grade, lever 15 is actuated and throws the clutch gearing into operation thereby actuating the winding shaft and applying the brakes, as indicated by the arrows Fig. 1.

When back pressure is released from rod 18 upon the team easing up forwardly, the rod 18 is thrust forward by any suitable spring, as a spiral spring 37 bearing against an abutment 38 on the tongue and abutment $38^a$ on the rod, thrusting the rod forward and reversing lever 22, which by tension member 25 pulls arm $b$ of lever 15, withdrawing the clutches and freeing the application of pressure to apply the brake, and leaving them subject to the ratchet lock. The brake is held applied by means of ratchet wheels 32 and 33, one of which 32 is mounted for some lost motion by the pin 32ª extending through slot 32ᵇ in its hub as shown in Fig. 8, and the pawls 30 and 31 connected to rock shaft 34 having a lever 34ª by a slack chain 35 and taut chains 35ª. Rock shaft 34 has an arm 34ª connected by wire or chain 36 to the double tree 26.

The double tree 26 is mounted underneath a bracket 27, normally retracted by a spring 28 and having a limited range of forward and back movement.

A partial and complete release of the brakes is accomplished by means of locking pawls 30 and 31 engaging ratchet wheels 32 and 33 and operated by the rock shaft 34 and its connections 35 to the pawls and connection 36 to the double tree 26. The pawls are adapted to operate alternately in locking to engage teeth of their respective wheels located between the teeth of the companion wheel and vice versa, thus allowing for a partial release by lifting one pawl in advance of the other. This is done by means of the taut connection 35ª, first releasing ratchet wheel 33, further movement of rock shaft 34 taking up the slack of chain 35 and releasing pawl 30, effecting full release of the brakes.

When the brakes have been set, they will be held set by the ratchet mechanism until thus partially or wholly released by a slight pull or moderately heavy pull forward on the double tree 26. It will be observed that the degree of pull necessary to release one or both ratchets may be easily and accurately adjusted by lengthening or shortening the connections.

For the purpose of positively effecting release of the clutches independent of spring 37 and to overcome any sticking I employ a loose chain 39 secured to the lower end of lever 22 and to the end of bolt 40 of double tree 26 as shown. The bolt 40 is mounted in a longitudinal slot 41 in the tongue allowing for a limited range of movement under pulling strains, so that connection 39 will positively throw lever 22 independent of spring action if necessary.

For the purpose of rendering the mechanism effective at all positions of the running gear, the connections 24, 25 and 36 are laced through the fifth wheel or king bolt 42 by the holes 43, preferably flaring at the front to allow for deflection, as clearly shown in Fig. 2, thus bringing all connections to the turning or king bolt center and maintaining tension and resulting operation irrespective of the front axle and wheels being turned.

It will be understood that but one clutch 13 and connection 16 to the lever 15 may be used with but one set of transmitting gearing 4, 5, with good results, and that a single ratchet and pawl for locking and un-locking may also be used. Also that various other changes may be made in the construction or design of the parts by the skilled mechanic, but all such changes are to be considered as within the scope of the following claims.

What I claim is:—

1. In a wagon brake, the combination with the wheels and axle; of a brake beam and shoes, a winding shaft connected with the brake beam, gearing connecting the winding shaft with the axle, clutch mechanism therefor, means embodying a neck yoke and a push rod for throwing said clutch mechanism into and out of gear dependent on whether backing or pulling movement is imparted to the wagon, a double tree, ratchet and pawl mechanism for locking and releasing the winding mechanism provided with primary and secondary pawls, a lever operatively connected with said pawls, and means connecting said lever with the double tree, substantially as set forth.

2. In a wagon brake, the combination with the wheels and axle; of a brake beam and shoes, a winding shaft connected with the brake beam, gearing connecting the winding shaft with the axle, clutch mechanism therefor, means embodying a neck yoke and a push rod for throwing said clutch mechanism into and out of gear dependent on whether backing or pulling movement is imparted to the wagon, ratchet and pawl mechanism for locking and releasing the winding mechanism embodying a pair of successively operable pawls, an actuating device connected with said pawls, a double tree, and means connecting the double tree with said ratchet and pawl actuating device.

3. In a wagon brake, the combination with the wheels and axle; of a brake beam and shoes, a winding shaft connected with the brake beam, gearing connecting the winding shaft with the axle, clutch mechanism therefor, means embodying a neck yoke and a push rod for throwing said clutch mechanism into and out of gear dependent on whether backing or pulling movement is imparted to the wagon, a ratchet wheel secured to the winding shaft, a pawl and operating mechanism therefor, a double tree, and means connecting the pawl-operating mechanism with the double tree, substantially as set forth.

4. In a wagon brake, the combination with the wheels and axle; of a brake beam and shoes, a winding shaft connected with the brake beam, gearing connecting the winding shaft with the axle, clutch mechanism therefor, means embodying a neck yoke and a push rod for throwing said clutch mechanism into and out of gear dependent on whether backing or pulling movement is imparted to the wagon, a ratchet wheel secured to the winding shaft, a pawl and operating mechanism therefor, a double tree, a spring for retracting the double tree, and means connecting the pawl-operating mechanism with the double tree, substantially as set forth.

In testimony whereof I affix my signature in presence of two witnesses.

JOHN L. TOMER.

Witnesses:
 C. M. CLARKE,
 CHAS. S. LEPLEY.